United States Patent [19]

Tomić et al.

[11] 4,153,439

[45] May 8, 1979

[54] METHOD FOR THE PRODUCTION OF MINERAL WOOL, ESPECIALLY FOR USE IN BASIC MILIEU

[75] Inventors: Relja Tomić; Ulf Åberg; Elis Karlsson, all of Skövde, Sweden

[73] Assignee: Rockwool Aktiebolaget, Skövde, Sweden

[21] Appl. No.: 804,297

[22] Filed: Jun. 7, 1977

[30] Foreign Application Priority Data

Jul. 22, 1976 [SE] Sweden .................. 7608341

[51] Int. Cl.² .............. C03B 37/00; C03C 13/00; C03C 3/04
[52] U.S. Cl. .............................. 65/2; 106/50; 106/99
[58] Field of Search .......... 65/2, 1; 106/50, 58, 106/52, 99

[56] References Cited

U.S. PATENT DOCUMENTS

| | | | |
|---|---|---|---|
| 3,736,162 | 5/1973 | Chvalovsky et al. | 106/50 X |
| 3,854,986 | 12/1974 | Chvalovsky et al. | 106/50 X |
| 4,002,482 | 1/1977 | Coenen | 106/50 X |
| 4,036,654 | 7/1977 | Yale et al. | 106/99 X |
| 4,055,434 | 10/1977 | Chen et al. | 106/50 |
| 4,090,882 | 5/1978 | Rauschenfels | 65/2 X |

OTHER PUBLICATIONS

The Microscopic Determination of Non-Opaque Minerals by Larsen and Berman, pp. 239-240.

*Primary Examiner*—Richard V. Fisher
*Assistant Examiner*—Frank W. Miga
*Attorney, Agent, or Firm*—Larson, Taylor and Hinds

[57] ABSTRACT

A method of producing alkali-resistant mineral wool. The starting material is melted and formed into fibers and the fibers are cooled and collected. The raw material has the following composition:

| | | |
|---|---|---|
| $SiO_2$ | | 40-60 wt. % |
| $Al_2O_3$ | | 1-15 wt. % |
| CaO | | 1-6 wt. % |
| MgO | | 30-45 wt. % |
| Iron oxides | | 1-8 wt. % |
| Alkali oxides | maximum | 2 wt. % |
| Other oxides | maximum | 2 wt. %. |

The raw material preferably includes olivine.

10 Claims, No Drawings

METHOD FOR THE PRODUCTION OF MINERAL WOOL, ESPECIALLY FOR USE IN BASIC MILIEU

The present invention refers to a method for the production of mineral wool, intended to be used for certain specific purposes, for which it is important that the mineral wool produced is little attackable by chemically active mediums, especially alkalically acting mediums.

Since a long time ago one has produced rather a lot of building and medium conduction products for instance discs, tubes and so on, for different kinds of system activity from so called asbestos cement.

Asbestos cement is characterized by rather a lot of advantageous properties, amongst which should be mentioned its high rigidity, its resistance against normally existing chemicals and its good aging properties. A disadvantage of asbestos cement, however, is that the production has to take place under such working conditions that asbestos particles are freely hovering in the air, sometimes of microscopic character, and that shaping, cutting, sawing and the like of products from asbestos cement also causes such freely hovering particles in the air. These particles are, to a high degree, dangerous to the health.

Caused thereby one has looked for a replacement medium for asbestos in the production of the products, which were earlier produced from asbestos cement and in this respect one has in first place regarded to replace the asbestos by mineral wool. Attempts to replace asbestos in the asbestos cement with mineral wool, however, have not been completely successful, and it has been stated, that the reason thereto has in first place been the little resistance of the mineral wool against alkalically chemical attacks. In this connection it should be reminded about that cement is formed by a tri-calcium ortho silicate, which in the way specific to silicates when water is added is subjected to a curing procedure, in which at least about thirty known phases exist. Thereby, amongst others a mono calcium silicate is produced but also $Ca(OH)_2$ which, when formed, is strongly chemically active, and in first place has a strong basic reaction.

Usual mineral wool of the type, hitherto used for instance as sound insulation and/or heat insulation, however, has too small resistance in alkalic milieu, and therefore it is very little suitable as replacement means for asbestos in the production of such reinforced products which are exemplified by asbestos cement.

One has also in the attempts forming basis of the present invention investigated water glass as a nonburnable binding means for mineral wool but also these attempts have not been successful. Even water glass has strong alkalic reaction and strong chemical attacks will as a rule, within shorter or longer time, be created on the mineral wool fibres.

The present invention is based upon a careful investigation of the possibilities of producing a mineral wool, which by choice of the initial materials or raw materials would be as effectively resistant as possible against chemical attacks, and thereby in first place against such attacks in alkalic milieu.

One has had no greater difficulty in solving this problem, as long as no economical points of view should be regarded. Thus, one could produce mineral wool under use of expensive and highly qualified stuffs, but such production is not economically defendable. Some examples of such a production are given account for in the U.S. Pat. No. 3,854,986 according to which one will add zirconium oxide or zinc oxide.

The present invention, however, has for its purpose to find a method which is well usable for the above mentioned purposes, as far as the mineral wool produced should not at all or only to small extent be receivable for such chemical attacks, especially such ones in alkalic milieu, of the general type existing in the binding of cement. This method depends upon the choice of the raw material, and this raw material thereby should be of such a type that only economically well available products are contained therein, and it should also be of such a type, that mineral wool can be produced in traditional spinning aggregates for mineral wool, such as these have been shaped for the traditional mineral wool production, especially stone wool and glass wool.

As mentioned above, this invention has been created by careful and comprehensive experiments, and thus it has in first place an empirical basis, even if rather a lot of theoretical considerings have formed basis for the choice of the investigated ways of solving the problem.

Thus, the invention refers to a method for the production of mineral wool by melting an initial material, fibrating said melt, and subsequent cooling of the fibres.

According to the invention one will use as a starting material a material or a composition of materials having the following analytic composition:

| | | |
|---|---|---|
| $SiO_2$ | 40–60 | percent of weight |
| $Al_2O_3$ | 1–15 | " |
| CaO | 1–6 | " |
| MgO | 30–45 | " |
| Fe-oxides | 1–8 | " |
| Alkali oxides | max 2 | " |
| Other oxides | max 2 | " |

In the tests it has further appeared, that the best results are obtained, if the above mentioned limit values for the ranges of variation are not used to their full extent, but if these limit values are kept with in the frame of the following narrow limits:

| | | |
|---|---|---|
| $SiO_2$ | 42–48 | per cent of weight |
| $Al_2O_3$ | 10–15 | " |
| CaO | 4–6 | " |
| MgO | 30–35 | " |
| Fe-oxides | 2–4 | " |
| Alkali oxides | max 1 | " |
| Other oxides | max 1 | " |

The composition of the created mineral wool, of course, mainly but not completely is the same as the composition of the raw material. For the purpose concerned in this case, however, one may with allowable approximation say that the composition of the mineral wool and the composition of the raw materials are identical.

An investigation amongst available natural minerals now has given at hand, that there is one economically available mineral, which satisfies the above given definition, viz. olivine, and the invention amongst others refers to the use of olivine either alone or in some compositions, further indicated below, as starting material for the production of mineral wool to be used under relations, which mean a disturbingly strong basic milieu. However, it should be observed, that an invention shall not be limited to the use of olivine, even if this material has proved to have very advantageous properties in the respects considered, and that this will apply irrespectively of if one uses a composition, containing olivine as its essential constituent, or olivine solely but one may also produce a completely usable composition of starting materials also under use of two or more other materials.

Olivine is a magnesium silicate in which, however, there are a lot of other compositions. Olivine, thus can be used for the purpose of the present invention without addition, but a much better starting material and as a consequence thereof a much better mineral wool can be obtained, if the olivine is mixed with a clay mineral in burnt or in non-burnt state, for instance chamotte and/or with sand or sand stone and/or with dolomite. There are several such addition materials which may exist simultaneously in composition with olivine.

If olivine is used along with exclusively clay minerals, e.g. chamotte then the clay mineral should be contained with no more than 40 percent of weight in the total raw material composition. If one uses not only clay mineral but also quartz sand and/or sand stone along with the olivine the clay mineral should be contained with no more than 35 percent of weight, and the quartz sand or the sand stone should then amount to no more than 40 percent of weight of the total composition. Olivine may also be mixed with dolomite, and in this case the quantity of dolomite should form no more than 20 percent of weight of the total weight of the composition.

It will be evident from the above, that dolomite and clay minerals may completely or in part replace each other, whereby, however, the clay mineral must amount to no more than 35 percent of weight of the total weight of the composition. The clay mineral which is used, suitably, should not contain more than 40 percent or weight of $Al_2O_3$. The clay minerals may be in burnt or in non-burnt state, and as mentioned they may preferably comprise chamotte, for instance chamotte brick work refuse, which forms a very cheap material.

In the tests, which conducted into the present invention, it has for instance proved that one can achieve a very good mineral wool using the following simple composition as starting material:

| Olivine | 60 per cent of weight |
|---------|----------------------|
| Chamotte | 40 per cent of weight |

Thereby the chamotte should have a content of $Al_2O_3$ of no more than 35 percent of weight. One may also get to good results, using 90 percent of weight of the above mentioned composition mixed with 10 percent of weight of dolomite. Rather great possibilities of variation, however, exist with respect to the said quantities.

Regarding the equipment for the production of mineral wool according to the present invention principally applies that one may use any known melting oven for the production of traditional mineral wool, preferably either a cupola oven or an electro oven, and that one may use any known spinning device. However, it has proved that the mineral wool will get to some extent different properties, depending upon the type of spinning aggregate, even if the starting material is one and the same. Anyhow, it is within the power of any man skilled in the art, after having got knowledge about the sense of the present invention, to find out the most suitable composition of the starting material composition within the above indicated limit values for the specific equipment used. This will apply both with regard to the equipment for the production of the melt and the equipment for its spinning, cooling and collection.

If one uses a cupola oven for the production of the melt, it has proved suitable to use a coarse piece material, for instance in so called first magnitude. As olivine is a type of stone existing in the nature, there is no difficulty to produce this material in suitable piece magnitude but on the other side it may be difficult to produce the clay mineral in such a suitable piece size. In practice one is therefore easily dependent upon the use of burnt clay material, for instance chamotte or chamotte brick work refuse. Dolomite also is a type of stone existing in the nature and it may easily be produced in a suitable magnitude of pieces, but on the other side silicon sand is in fine grains. Such sand, therefore, is preferably used in the form of sand stone, which can easily be divided in a suitable magnitude of pieces. Another way of binding the sand is to burn a mixture of clay and sand, of clay and dolomite or of sand and clay and dolomite. This burning should be continued so far that a chemical binding is created, whereby the bond material is divided up into a suitable magnitude of pieces, and subsequently is passed through a sieve. Material, separated in the sieving, of course can be used for new burning.

The spinning and the collection of the spun mineral wool can take place in any traditional way, and here, therefore, mainly the same rules will apply which are already wellknown to the man skilled in the art in connection to the traditional production of mineral wool, for instance for insulation purposes.

In connection with the creation of the present invention one has also found out the resistance of the mineral wool obtained, against attacks from alkali. A very good method for this test is the one, indicated in DIN 52.322. According to this method, the mineral wool is soaked during three hours of time at 100° C. temperature in a solution, comprising two parts of weight NaOH and one part of weight $Na_2CO_3$, whereafter the loss of weight is stated, said loss giving an expression for the alkali resistance. The loss of weight, thereby, may either be indicated in percent or in milligrams pro square decimeter surface of the fibres.

Below, account will be given for one such test:

The melt was produced in a cupola oven which was loaded with a mixture of 60 percent of weight olivine, 30 percent of weight of chamotte with a content of 35% $Al_2O_3$, and 10 percent of weight of dolomite along with the required quantity of coke for causing a burning and melting. The melt was fibrated in a traditional spinning aggregate comprising four spinner wheels connected in cascade. In the same aggregate and in the same oven one had also for comparison purposes, produced traditional stone wool and glass wool, respectively.

At the tests one got in the above mentioned way the following results.

| Kind of mineral wool | Loss of weight in soaking | |
|---|---|---|
| | in percent of weight | in mg/dm² |
| Commercial stone wool | 8,7 | 42,2 |
| Commerical glass wool | 42,5 | 273,8 |
| Mineral wool according to the present invention | 2,2 | 7,5 |

This comparison will give at hand that the use of commercial glass wool is extremely unsuitable due to the especially great tendency of attack in alkalic milieu. This, as a matter of fact, was close to five times as great as for commercial stone wool. But also commercial stone wool shows a too great tendency of being attacked in alkalic milieu, which was, in round figures, four times as high as the corresponding tendency of mineral wool which had been produced according to the present invention.

What is claimed is:

1. A method of producing mineral wool comprising the steps of:
  (a) providing a raw material comprising, as an essential ingredient olivine, the remaining components being of such type and present in such amount that the said raw material will have the following composition:

| | | |
|---|---|---|
| $SiO_2$ | | 40–60 wt. % |
| $Al_2O_3$ | | 1–15 wt. % |
| CaO | | 1–6 wt. % |
| MgO | | 30–45 wt. % |
| Iron oxides | | 1–8 wt. % |
| Alkali oxides | maximum | 2 wt. % |
| Other oxides | maximum | 2 wt. %; |

(b) melting said raw material;
  (c) forming the molten raw material into fiber;
  (d) cooling the fibers; and
  (e) collecting the cooled fibers.

2. A method according to claim 1 wherein said raw material has the composition:

| | | |
|---|---|---|
| $SiO_2$ | | 42–48 wt. % |
| $Al_2O_3$ | | 10–15 wt. % |
| CaO | | 4–6 wt. % |
| MgO | | 30–35 wt. % |
| Iron oxides | | 2–4 wt. % |
| Alkali oxides | maximum | 1 wt. % |
| Other oxides | maximum | 1 wt. %. |

3. A method according to claim 1 in which said raw material contains up to 40 percent by weight of clay containing no more than 40 percent of weight $Al_2O_3$.

4. A method according to claim 1 in which said raw material contains up to 35 percent by weight of clay, said clay material containing no more than 40 percent of weight of $Al_2O_3$, and in addition thereto no more than 40 percent of weight of silicon sand or sand stone.

5. A method according to claim 1 in which there is contained in the raw material, in addition to olivine, no more than 20 percent of weight of dolomite and no more than 35 percent of weight of burnt or non-burnt clay.

6. A method according to claim 5 in which said raw material comprises about 60 percent of weight of olivine, about 30 percent of weight of chamotte, having a content of no more than 35 percent of $Al_2O_3$, and finally about 10 percent of weight of dolomite.

7. A method according to claim 1 wherein said step of melting said raw material comprises feeding said raw material to a cupola oven in the form of approximately fist-size pieces.

8. A method according to claim 1 wherein said raw material comprises a mixture of clay and at least one member selected from the group consisting of sand and dolomite and wherein said method includes the steps of heating said mixture to form a chemically bound material of ceramic consistency, and crushing the bound material into coarse pieces prior to melting said raw material.

9. A method according to claim 8 in which the crushed, ceramically bound clay material is sieved to remove fines prior to melting said raw material.

10. A method according to claim 3 wherein said clay comprises chamotte.

* * * * *